UNITED STATES PATENT OFFICE.

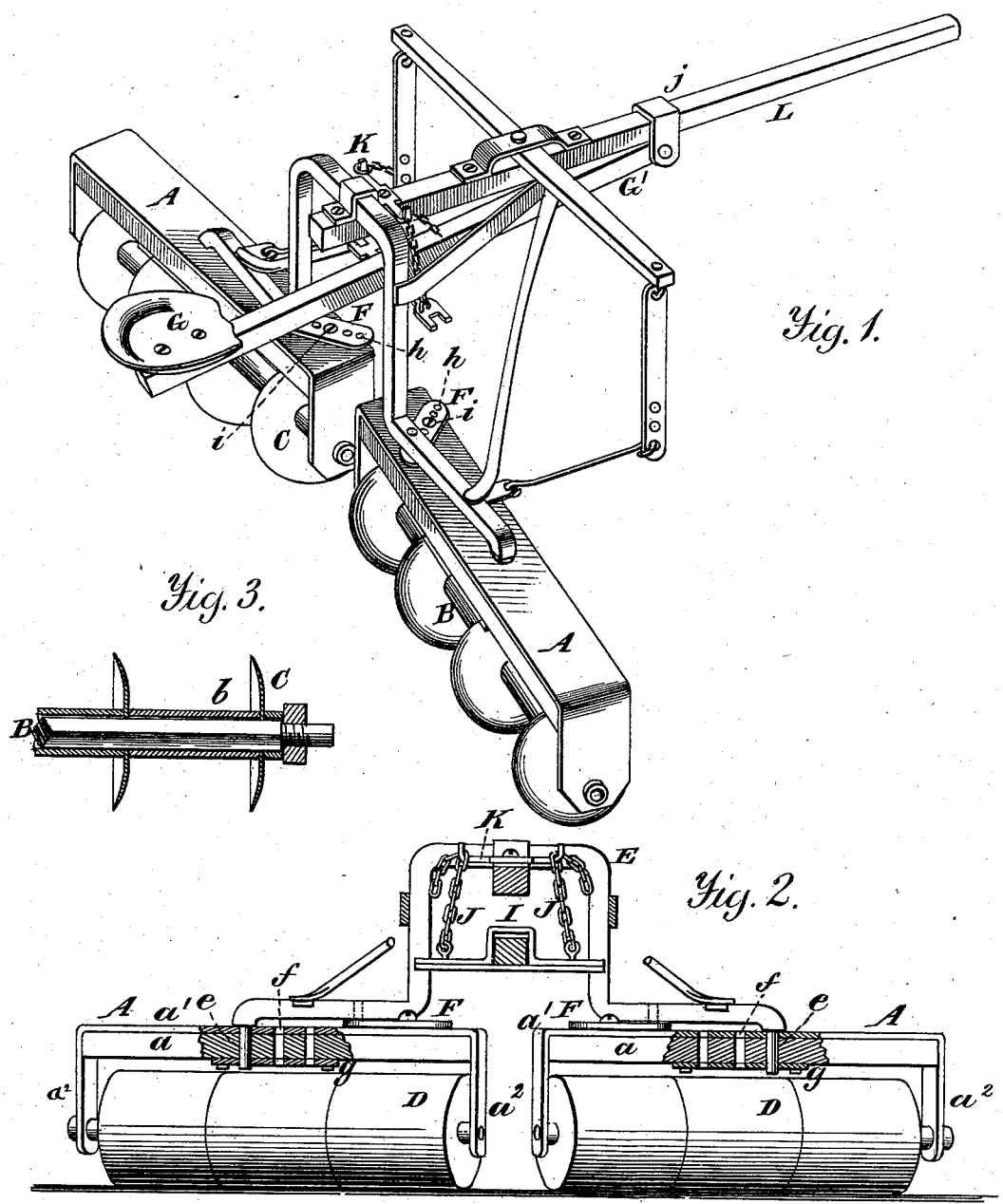

GEORGE R. JOHNSON, OF RUSSELL, IOWA, ASSIGNOR TO JOHN C. COOK, OF SAME PLACE.

CORN-CULTIVATOR.

SPECIFICATION forming part of Letters Patent No. 225,526, dated March 16, 1880.

Application filed June 6, 1879.

*To all whom it may concern:*

Be it known that I, GEORGE R. JOHNSON, of Russell, in the county of Lucas and State of Iowa, have invented certain new and useful Improvements in a Corn-Cultivator; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1 is a representation of a perspective view of my improved corn-cultivator and land-roller. Fig. 2 is partly a section and front elevation of the same, and Fig. 3 is a vertical longitudinal section of a detailed broken-away portion thereof.

This invention has relation to certain improvements in corn-cultivators and land-rollers, having for its object to effect the covering or cultivating of the plant; to adjust the sections or wings of the machine different distances apart, or vice versa; to vary the angle of presentation of their shovels or rollers to the ground, and to vary the adjustment of the seat to suitable heights.

The nature of my invention consists in the combination, with a tongue-yoke, of a pivotal seat-bar and its seat provided with a guide-support adapted to move up and down on the vertical portions of said yoke, chains, and hooked cross-tree, substantially as hereinafter more fully set forth and claimed.

In the accompanying drawings, A A indicate two sections or wings composed of two lateral beams, *a a*, to which are bolted, preferably to their upper sides, plates of metal *a'* *a'*, with their ends extended downwardly, as at *a² a²*, to form bearings, which receive the rotary cutter or shovel or roll-shafts B.

C C are the rotary shovels or cutters, spaced and held apart on the shafts B by intermediate sleeves or boxes, *b b*, inclosing the said shafts. These shafts are angular, except at their points of bearing, to prevent the independent turning thereon of the cutters, or to prevent their turning only with the shafts.
The form of the shovels or cutters, *per se*, is that of a concaved disk, their curved edges or perimeters serving, in connection with cutting into the ground, to throw the loosened earth or dirt around the bases of the plants or corn. It is plain that these cutters will also comminute or pulverize the clods in plowed ground, thus acting in the capacity of a harrow, or cut sods, and that they may be replaced by rolls D D, as seen in Fig. 2, when it is desired to roll or smooth the ground.

E is the tongue-yoke, with its horizontal portions provided with pins or studs *e e*, which enter the coincident perforations or holes of the series *f f* in the sections or beams A, as seen in Fig. 2. This permits the sections of shovels or rollers to be placed farther apart or brought nearer together, to adapt the same to cultivate or roll the ground on each side of a greater or less width of path or space between rows of corn.

If desired, the lower edges of the series of perforations in the sections or beams may be strengthened by bolting or fastening to the under side of the beams metallic plates *g g*, as seen in Fig. 2.

F F are plates or bars, with their inner ends pivoted in the lower sides of the horizontal portions of the yoke E, as indicated in dotted lines in Fig. 2, and provided with series of perforations or holes *h h*, as seen in Fig. 1, which receive set or adjusting screws *i i*, the object of which is to effect the adjustment of the two sections so as to vary the angle of presentation of the shovels or rollers to the ground as may be desired. These plates with their fastenings also aid to fasten the section A to the tongue-yoke.

G is the driver's seat, mounted on a bar, G', with its forward end pivoted in a clip, *j*, hung upon the tongue. The seat is thus permitted to be moved back and forth as occasion may require. Contiguous to the seat the bar G' is supported, and can slide, in the direction of its length, in a cross-bar, I, clipped to the said seat-bar and adapted to move up and down and fit the vertical portions of the yoke E, as seen in Figs. 1 and 2. The seat-bar support I has attached to it chains or similar means J, which engage with a hooked cross tree or bar, K, fastened on the rear end of the tongue, as seen in Figs. 1 and 2. This arrangement permits the adjustment of the seat to any desired height to suit the convenience of the driver or occupant.

L is the tongue or draft-pole, clipped to the yoke E, and otherwise braced thereto, as shown, and provided with the usual means for hitching up the team to the machine.

Having thus fully described my invention, I claim and desire to secure by Letters Patent—

The combination, with the tongue-yoke, of the pivoted seat-bar and its seat, provided with a guide-support adapted to move up and down on the vertical portions of the yoke E, chains, and a hooked cross tree or bar on the tongue, substantially as and for the purpose specified.

In testimony that I claim the foregoing as my own I affix my signature in presence of two witnesses.

GEORGE R. JOHNSON.

Witnesses:
   J. C. COOK,
   ALFRED GOODWIN.